United States Patent [19]
Yim

[11] Patent Number: 5,761,693
[45] Date of Patent: Jun. 2, 1998

[54] METHOD AND APPARATUS FOR ENABLING ACCESS TO TWO CONTIGUOUS ADDRESSES IN UNITS OF A MEMORY SEGMENT SIMULTANEOUSLY

[75] Inventor: Myung-sik Yim, Seoul, Rep. of Korea

[73] Assignee: Samsung Electronics Co., Ltd., Kyungki-Do, Rep. of Korea

[21] Appl. No.: 525,146

[22] Filed: Sep. 8, 1995

[30] Foreign Application Priority Data

Sep. 8, 1994 [KR] Rep. of Korea .............. 94-22641

[51] Int. Cl.$^6$ .............................. G06F 9/28; G06F 12/02
[52] U.S. Cl. .................. 711/5; 711/1; 711/2; 711/4; 711/151
[58] Field of Search ................. 395/405, 401, 395/402, 404, 477

[56] References Cited

U.S. PATENT DOCUMENTS 4,392,201  7/1983  Brown et al. ............. 395/405
4,875,161  10/1989  Lahti ....................... 395/405

*Primary Examiner*—David K. Moore
*Assistant Examiner*—Than V. Nguyen
*Attorney, Agent, or Firm*—Sughrue, Mion, Zinn, Macpeak & Seas, PLLC

[57] ABSTRACT

A memory access method and apparatus which may access bytes of information from two contiguous memory segment addresses at a time. The amount of information which is accessed at one time is a memory access unit. The number of bytes in a memory segment is also the number of bytes in a memory access unit. The method and apparatus for accessing memory divides each memory segment between separate memories having the same number as the number of bytes in a memory segment. Each of the memories are simultaneously addressed according to a segment address input and an offset input, to thereby enable selected bytes of information stored through two contiguous memory segment addresses to be accessed. Although bytes in two contiguous memory segments may be accessed at a given moment, no more bytes than are contained in a memory access unit are accessed at a given moment. Thus, it is unnecessary to access the entirety of both of the contiguous memory segments in separate accessing steps when it is desired to access a memory access unit worth of information which lies across a memory segment boundary. Without the extra accessing step, memory accessing efficiency is improved.

2 Claims, 3 Drawing Sheets

1

METHOD AND APPARATUS FOR ENABLING ACCESS TO TWO CONTIGUOUS ADDRESSES IN UNITS OF A MEMORY SEGMENT SIMULTANEOUSLY

BACKGROUND OF THE INVENTION

The present invention relates to a memory access method and apparatus therefor, which enables access to two contiguous addresses in units of a memory segment, both at one time.

Memories for storing information have various usages. Memories having various functions and capacity have been developed and commercialized according to usages of equipment where the memories are incorporated therein.

Generally, a memory access unit is an amount of information which is read at a time from a memory or written at a time in the memory, and is restricted in size in comparison with an amount of information stored in the memory. Thus, a plurality of "memory segments" each of which is a conceptual compartment having a size of a memory access unit are formed in the memory. One segment address is assigned in each memory segment, to access the memory in units of a segment according to an address input.

When information desired to be read from the memory or to be written into the memory straddles two segments in the memory, that is, in the case of accessing the necessary information through two contiguous segment addresses, access of the information raises a problem.

Conventionally, in such a case, after all portions (or bytes) of the memory segments corresponding to two contiguous memory segments have been accessed, the memory segments are rearranged to use the desired portions. This requires having to gain an access to unnecessary memory bytes in addition to the desired bytes of the memory segments. In the case of a memory which is used in equipment for writing or reading a large amount of information within a short time and frequently, the above access method is very inefficient and results in lowering functional efficiency of the overall device.

SUMMARY OF THE INVENTION

Therefore, to solve the above problems, it is an object of the present invention to provide a method and an apparatus for accessing information stored through two contiguous memory segment addresses at one time.

Thus, to accomplish the above object of the present invention, there is provided a memory access method, the method comprising the steps of:

dividing a memory segment by the number of bytes per segment in the same number of memories as the number of bytes per memory segment; determining a segment address to be initially accessed and a position to be initially accessed among the bytes of the memory segment of the determined segment address as an offset value; and accessing one memory access unit of data simultaneously from contiguous memory segments by using the determined address and the determined offset value.

Also, to accomplish the above object of the present invention, there is provided a memory access apparatus comprising:

memories for a dividing memory segment by the number of bytes per segment; and an address transformer including an address input portion and an offset input portion, for determining portions of the memories to be accessed with respect to the memories according to an address input and an offset input.

2

For example, when dividing the memory segment, the memory segment of a specific segment address is divided into eight memories (the number of bytes per segment) and each memory stores/produces one byte. Then, the same address as the specific address is assigned to each memory, the memories being enumerated according to their corresponding byte position.

The segment address where information to be initially accessed designated as a segment address input. An offset input is determined by a selected byte position to be initially accessed in the memory segment corresponding to the designated address.

During the address transformation, an input address is sent unaltered to the random access memories (RAMs) having being assigned byte position numbers equal to or larger than an offset input, while the following address is accessed by adding "1" to the address input for the RAMs having been assigned byte position numbers smaller than the offset input.

BRIEF DESCRIPTION OF THE DRAWINGS

The preferred embodiments are described with reference to the drawings wherein.

DETAILED DESCRIPTION OF THE PREFERRED EMBODIMENT

According to a preferred embodiment of the present invention the size of the memory segment is 8-bytes. This embodiment will be described below in more detail with reference to the accompanying drawings.

Figure 1:
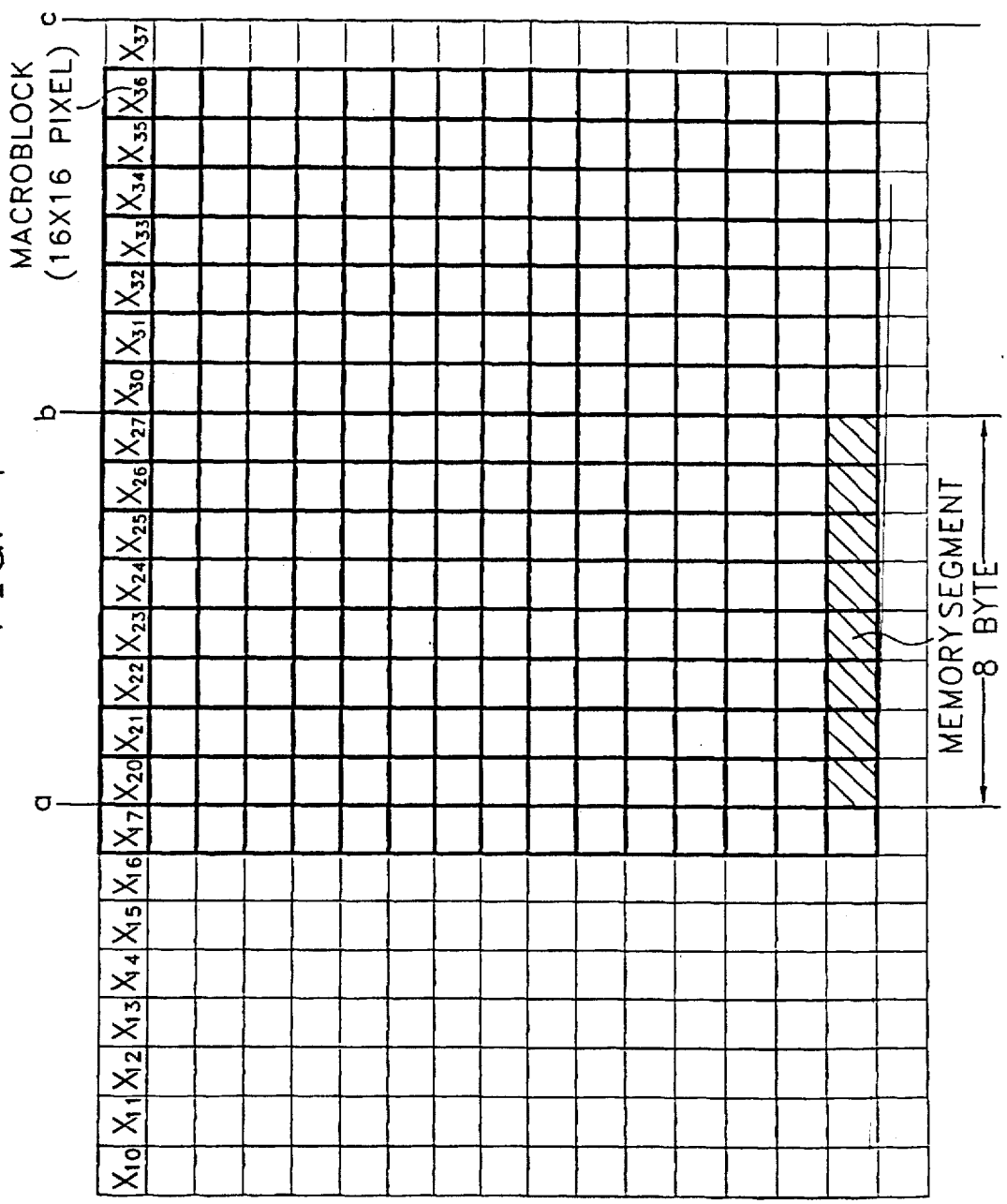
FIG. 1 is a conceptual view showing that a macroblock (16-byte by 16-byte) of video data is overlapped in the memory units of a memory which has 8-byte segments.

FIG. 1 is a conceptual view showing that a macroblock (16-byte by 16-byte) of video data is overlapped in the memory segments of a memory. Each memory segment is 8 bytes.

High-definition television (HDTV), cable television (CATV), video conference units and video phones have in common a need for a motion compensator to efficiently compress enormous amounts of video information. The motion compensator generally must access a frame memory frequently.

A basic unit of a conventional motion compensation is "macroblock" and a 16×16 block of pixels is the most commonly used size for a macroblock. The video information of one pixel corresponds to the capacity of a 1-byte memory in case of a luminance signal.

In this embodiment, when the unit size of the memory segment is 8 bytes, a signal address is assigned to 8-byte memory access units.

One compartment in the portion represented by the thinner solid line in FIG. 1 corresponds to one byte of a frame memory. The portion represented as the thicker solid line overlapped on the thinner solid line represents a position in the frame memory of the macroblock video information having the size of 16×16 bytes.

The $X_{ij}$'s represent positions of the memory segments corresponding to particular byte addresses. Here, i represents a segment address and j represents a byte position within that segment. That is, $X_{10}$ to $X_{17}$ represent byte positions corresponding to segment address #1, $X_{20}$ to $X_{27}$ represent byte positions corresponding to segment address #2, and $X_{30}$ to $X_{37}$ represent byte positions corresponding to segment address #3.

The hatched portions shown in FIG. 1 represent a size of the memory segments in which case the size is 8 bytes. The lines indicated as a, b and c compart the memory segment vertically according to the segment addresses at a position where image information of the macroblock is positioned.

As shown in FIG. 1, the image information of horizontal 16 bytes in the macroblock overlies the lines a and b for comparting the memory segment and the image information of the first 8 bytes in the macroblock overlies two contiguous addresses of segment addresses #1 and #2.

Figure 2:
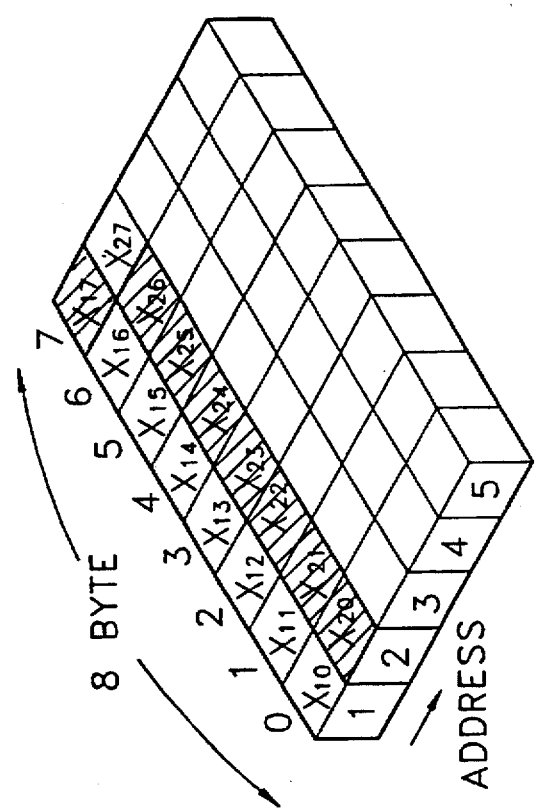
FIG. 2 is a conceptual view showing that an initial 8-bytes of the macroblock in the video data is stored through two contiguous 8-byte memory segments.

FIG. 2 is a conceptual view showing that initial 8-bytes of the macroblock in the video data is stored through two contiguous memory segments having separate addresses.

Referring to FIG. 2, it can be seen that the video information of the first 8 bytes (indicated by hatching) overlies a position of $X_{17}$ in segment address #1 and positions of $X_{20}$ through $X_{26}$ in segment address #2

Figure 3:
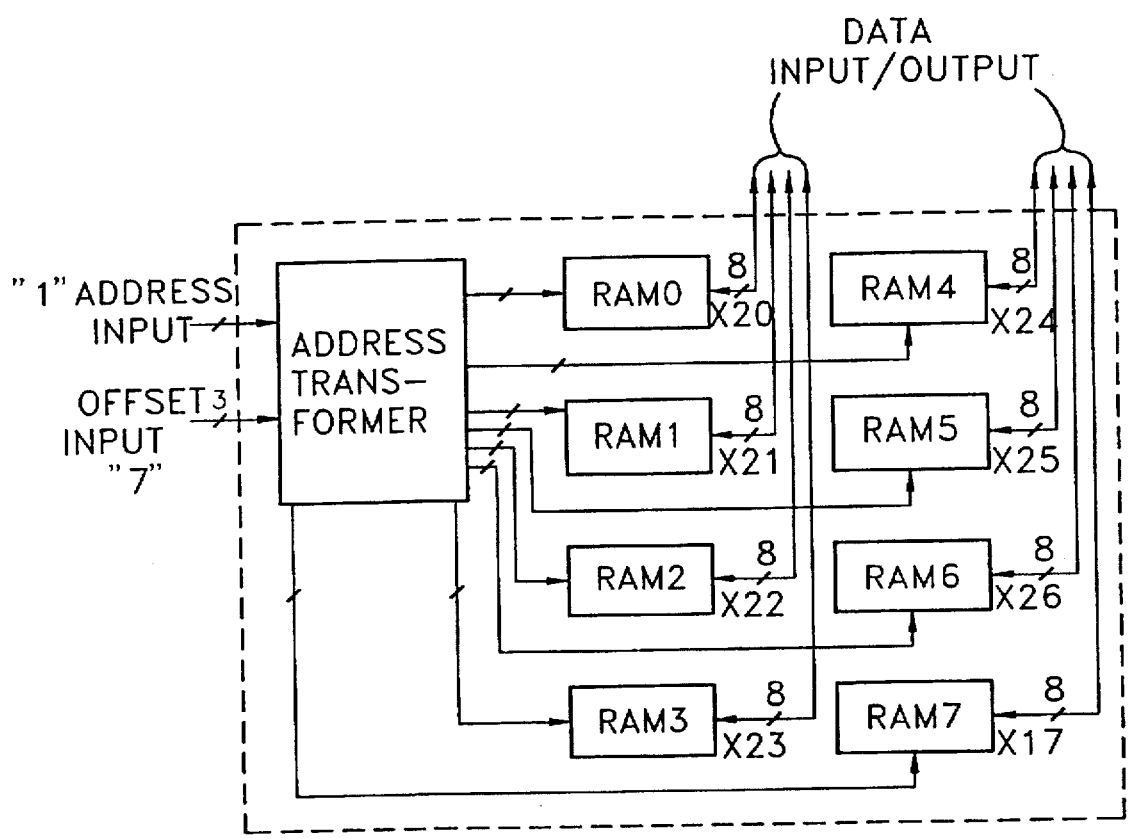
FIG. 3 is a block diagram for explaining one embodiment of the present invention for accessing 8-byte blocks of data stored through two contiguous 8-byte memory segments shown in FIG. 2.

FIG. 3 is a block diagram for explaining one embodiment of the present invention for accessing an 8-byte block of data stored through two contiguous memory segment addresses shown in FIG. 2.

In this embodiment, since the size of the memory segment is 8 bytes, the apparatus according to the present invention includes eight random access memories, or RAMs (RAM 0 through RAM 7). An address transformer 11 in memory access apparatus 10 according to the present invention includes an offset input portion as well as a conventional address input portion. The 8-byte memory segment of a specific address is divided into eight RAM memories which are each assigned with the same address as the specific address.

Portion (or byte) $X_{10}$ is assigned to address #1 of RAM 0, portion $X_{20}$ is assigned to address #2 thereof, portion $X_{30}$ is assigned to address #3 thereof, and so forth. Generally, portion $X_{NO}$ is assigned to address #N thereof. Here, N is the number of address. Portion (or byte) $X_{11}$ is assigned to address #1 of RAM 1, portion $X_{21}$ is assigned to address #2 thereof, portion $X_{31}$ is assigned to address #3 thereof, and so forth. Generally, portion $X_{N1}$ is assigned to address #N thereof. With respect to RAM 2 through RAM 6, portion (or byte) $X_{Nj}$ is assigned to address #N. Finally, portion (or byte) $X_{17}$ is assigned to address #1 of RAM 7, portion $X_{27}$ is assigned to address #2 thereof and portion $X_{37}$ is assigned to address #3 thereof, and so forth. Generally, portion $X_{N7}$ is assigned to address #N thereof.

The address input portion of the address transformer 11 designates an address where information is to be initially accessed. The offset input portion of the address transformer 11 determines which byte (or portion) is to be initially accessed in the memory segment corresponding to the designated segment address.

Since the memory portion to be initially accessed in FIG. 2 is $X_{17}$, the address input is "1" and the offset input is "7".

Since the memory segment unit is 8 bytes in this embodiment, a three bit offset input portion is required for selecting between eight choices of the offsets.

Address transformer 11 makes a RAM having the number not less than the offset input access an input address as it is, and makes a RAM having the number smaller than the offset input access the following address obtained by adding "1" to the address input.

That is, the RAM 7 memory accesses the input address as it is, while the other memories RAM 0 through RAM 6 access the following address obtained by adding "1" to the address input.

The addresses of eight RAMs which are determined by address transformer 11 as described above are accessed at the same time. Accordingly, byte addresses as many as the memory access unit of 8 bytes can be sequentially accessed through the following address starting from the portion (or byte) to be initially accessed.

As shown in FIG. 3, portion (or byte) $X_{17}$ of address #1 is accessed in the RAM 7, portion $X_{20}$ of address #2 is accessed in the RAM 0, portion $X_{21}$ of address #2 is accessed in the RAM 1, portion $X_{22}$ of address #2 is accessed in the RAM 2, portion $X_{23}$ of address #2 is accessed in the RAM 3, portion $X_{24}$ of address #2 is accessed in the RAM 4, portion $X_{25}$ of address #2 is accessed in the RAM 5, portion $X_{26}$ of address #2 is accessed in the RAM 6. Accordingly, if eight RAMs are simultaneously accessed, the 8 bytes of $X_{17}$, and $X_{20}$ through $X_{26}$ which are stored through two contiguous memory segment addresses can be accessed at a single instant in time.

As described above, the memory access method and apparatus according to the present invention can efficiently access even information stored through two contiguous memory segment addresses at a single time, i.e., during a single read cycle or a single write cycle.

The memory access method and apparatus according to the present invention does not perform unnecessary memory access steps, and thereby eradicates inefficiency in the conventional memory access method. This improves the functional efficiency of equipment which includes the memory access according to the present invention.

While only certain embodiments of the invention have been specifically described herein, it will apparent that numerous modifications may be made thereto without departing from the spirit and scope of the invention.

What is claimed is:

1. A method for accessing memory segments which have segment addresses and which contain a number of bytes, said method comprising the steps of:

dividing the memory segments between a number of memories, the number of memories being the same as the number of bytes per memory segment;

determining a segment address to be initially accessed;

determining a position to be initially accessed among the bytes of the memory segment of the determined segment address as an offset value; and accessing one memory access unit of data simultaneously from contiguous memory segments by using the determined segment address and the determined offset value;

wherein said step of dividing the memory segments comprises the steps of:

dividing each of the respective bytes of each memory segment in sequence into one of said memories, said memories being organized to correspond to the sequence and each of said memories contains a byte from each of said memory segments, and assigning a number to each memory based on the sequence; and wherein in said accessing step, the memory having a number not less than the offset value accesses the determined segment address and the memory having a number smaller than the offset value accesses the segment address following the determined segment address, thereby simultaneously accessing a memory access unit of information across two contiguous memory segments.

2. A memory access apparatus for simultaneously accessing bytes in distinct memory segments, comprising:

memories for dividing memory segments into individual bytes such that each byte of the memory segments is independently accessible; and an address transformer receiving a segment address input and an offset input, for determining a portion to be accessed in each of the memories according to said segment address input and said offset input;

wherein said memories have numbers corresponding to the respective byte of the memory segment which is divided between the respective memories; and wherein said address transformer determines that the memories having a number not less than a value of the offset input access the input segment address, and determines that the memories having a number smaller than a value of the offset input access the segment address following the input segment address.

* * * * *